Aug. 30, 1966 W. M. TURNER 3,270,161

HIGH SPEED MAGNETIC REED SWITCH

Filed Dec. 23, 1963

INVENTOR.
WHEELER M. TURNER
BY Christie, Parker & Hale
ATTORNEYS.

United States Patent Office 3,270,161

Patented August 30, 1966

3,270,161

HIGH SPEED MAGNETIC REED SWITCH

Wheeler M. Turner, 765 Riven Rock Road, Santa Barbara, Calif.

Filed Dec. 23, 1963, Ser. No. 334,077
5 Claims. (Cl. 335—151)

This application is a continuation-in-part of application Serial No. 113,361, filed May 29, 1961, now abandoned.

This invention relates to a mechanical type electric switch and, more particularly, is concerned with a high speed magnetically operated switch.

Multiplexing systems, useful in transmitting large amounts of data, have come into prominent use in many scientific and military applications. Such multiplexing systems require some type of commutator arrangement for sequentially sampling a large number of low-level input information signals. The commutator must be able to switch at high speeds, and, at the same time, be able to couple the input signals to the output of the commutator without deterioration of the low-level signal by the introduction of noise or spurious E.M.F.'s.

Mechanical type commutator switches have been developed for use in multiplexing systems. However, known mechanically operated commutator switches provide rather limited switching rates. Furthermore, mechanical switching contacts are subject to wear, limiting their useful life, and also generate thermal and contact noise adversely affecting the information signals.

Electronic solid state switches using transistors or diodes have been developed which are capable of much higher switching speeds than known mechanical type commutator switches. However, due to junction E.M.F.'s which vary with temperature, such switches are not entirely satisfactory where they are switching low-level signals. Special circuits are required to compensate for spurious voltages introduced by the switch and to compensate for variations in the circuit parameters with temperature. As a result, electronic low-level switches, while achieving higher switching rates, are not entirely satisfactory for low-level switching and are very much more expensive than mechanical type commutator switches.

These and other disadvantages of the known prior art of commutator switches are overcome by the present invention which provides a mechanical type switch that can be operated at switching rates many times faster than has heretofore been achieved. Not only is the switch of the present invention capable of operating at higher speeds than mechanical switches heretofore produced, but the switch of the present invention has a virtually infinite operating life, is capable of operating over a wide range of environmental conditions, is substantially noise free, and therefore is capable of switching very low-level signals.

These and other advantages of the present invention are achieved by providing a switch element having a sealed tubular housing filled with a nonconductive fluid of low viscosity and having special wetting properties. A pair of cantilever supported members made of magnetic material are located in the housing and immersed in the fluid, the free ends of the members being held in overlapping closely spaced relationship. In one embodiment of the invention, a small amount of very fine conductive magnetic particles are placed in the fluid. The switch is operated by applying a magnetic field which is substantially aligned with the cantilever members and extends across the gap between the free ends. The particles are attracted by the magnetic field in the space between the free ends of the members to form a conductive bridge between the two members, completing an electric circuit. On removal of the magnetic field, the attraction force between the particles is removed, permitting the fluid, due to its wetting properties, to immediately flow between the particles, insulating them from each other and breaking the current path.

In particular, sulfate wood turpentine or certain of its constituents have been found to have excellent properties for use in high speed switches of the type described. The properties of these materials in fact are important not only in the switch embodiment using magnetic particles but in improving the switching characteristics in similar switches in which direct contact is made between the cantilever members.

For a more complete understanding of the invention, reference should be made to the accompanying drawings, wherein.

Figure 1:
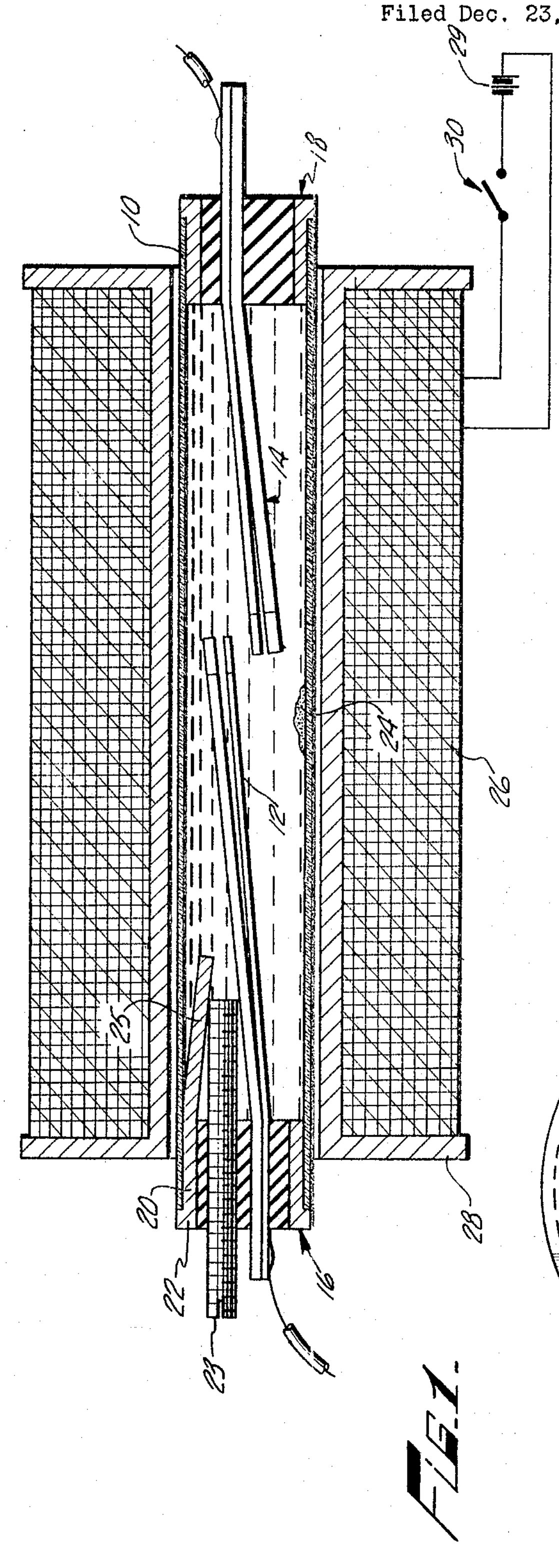
FIGURE 1 is a sectional view of the preferred embodiment of the invention.
Figure 2:
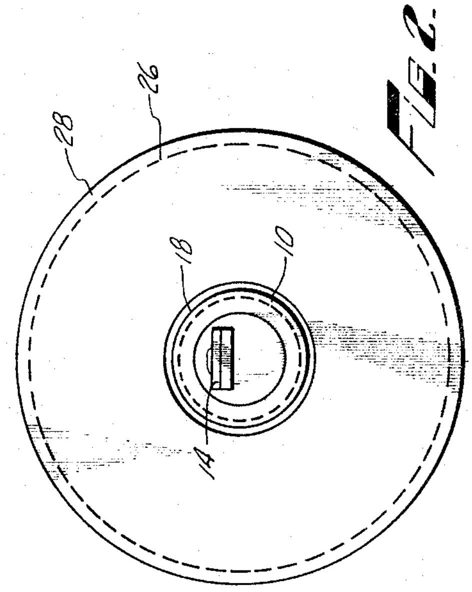
FIGURE 2 is an end view of the embodiment shown in FIGURE 1.

Referring to FIGURES 1 and 2 in detail, the numeral 10 indicates generally a hollow tubular housing preferably made of glass or other suitable material for forming an enclosure for the switch. A pair of contact members, indicated generally at 12 and 14 respectively, are supported in cantilever fashion within the tubular housing 10 by a pair of end plugs 16 and 18 which provide sealed ends for the enclosure surrounding the inner ends of the contact members.

The end plugs 16 and 18 preferably are each constructed from a cylindrical brass fitting 20 which is cemented or otherwise secured in the open end of the tube 10. The brass fitting is provided with a shoulder 22 which engages the end of the tube 10. As best shown in FIGURE 2, the contact member is soldered to the inner wall of the brass fitting. The width of the contact member being less than the inner diameter of the brass plug, the contact member is secured off-center of the axis of the plug and associated tube 10. The plugs 16 and 18 are oriented such that the contact members 12 and 14 are offset in the opposite directions relative to the central axis of the tube 10 and associated brass fittings of the plugs 16 and 18. The remaining opening of the brass fitting is then filled with an epoxy resin or other suitable material to provide a sealed enclosure. The outer ends of the contact members 12 and 14 may project beyond the plugs to provide electrical contacts to which leads can be soldered for connecting an external circuit across the switch.

As shown in FIGURE 1, the contact members 12 and 14 project towards each other but extend at an angle to the longitudinal axis of the tube 10 so that the inner ends of the contact members are normally positioned in slightly overlapping relationship with a gap between the overlapping ends. The ends of the members are leveled off to a substantial point.

The spacing at the inner ends of the contact members 12 and 14 may be adjusted by means of a screw 23 threaded through the epoxy material in the end plug 16. The brass fitting 20 is formed with a projecting tip 25 positioned so that the inner end of the screw 23 wedges between the contact member 12 and the tip 25. In this manner, the screw presses the inner end of the contact member 12 toward the contact member 14.

The entire open region within the housing formed by the tube 10 and end plugs 16 and 18 is filled with a liquid, which is preferably a fluid sulfate wood turpentine. A small quantity of powdered nickel is introduced into the housing and normally collects at the bottom of the tube in a small pile such as indicated at 24. The particles of pure nickel have magnetic properties, permitting them to be magnetized. At the same time, they are electrically conductive and chemically stable. The turpentine has the desirable properties that it has low viscosity, permitting high mobility of the magnetic particles, it acts as a good wetting agent to rapidly form an insulating film between adjacent particles when the particles are not magnetized.

Operation of the switch is controlled by a magnetic field produced by a wire coil 26 wrapped on a spool 28 and positioned around the tube 10 of the switch. The coil is energized from a suitable source such as a battery 29 controlled by any suitable switching means 30. On closing of the switch 30, the energized coil 26 produces a magnetic field in which the flux lines pass along the axis of the tube 10. Because the contact members 12 and 14 are made of a high permeability material, a high flux density is produced across the gap between the ends of the contact members. This attracts the fine nickel particles into the gap, and also attracts the ends of the contact members towards each other slightly so as to compress the particles in the gap, providing a good electrical current path across the gap. When the switch 30 is open, the activating magnetic field is removed permitting the contact members to separate slightly. Due to the wetting effect of the liquid turpentine, the nonconductive liquid quickly flows between the micron sized nickel particles through capillary action, surrounding each particle with an insulating film of liquid. The result is that the electrical resistance between the ends of the contact members increases rapidly. As the magnetic field is reapplied, the nickel particles again compress into a tight mass in the gap, squeezing out the liquid and breaking the surface tension of the liquid between the particles so that the nickel particles again come into electrical contact with each other to provide a low resistance path across the gap. The switch can go from an open to a closed condition and back to an open condition at an extremely rapid rate with the nickel particles remaining in the gap and undergoing very small physical movement.

Overall speed in performance of the switch is increased by several important design features of the switch. First, the contact members are pointed at their inner ends to provide a concentration of the magnetic field in the gap.

Second, the contact members are arranged in overlapping relationship rather than opposed relationship. This produces a slight compression of the particles attracted to the gap by the magnetic force moving the ends of the contact members towards each other when the magnetic field is applied. The overlapping relationship also produces a distortion or bending of the magnetic lines of force at the gap which has been found to produce a more rapid collapse of the field in the gap when the magnetizing coil is de-energized.

Third, the contact members are laminated. Thus each contact member comprises two strips. The strips are preferably of an unequal thickness with the strips of the two contact members which lie closest to each other at the gap being of the order of half the thickness of the remaining strips forming the contact members. The laminated strips are secured in contact only at the point of support within the end plugs 12 and 14. The laminations diverge very slightly over the remaining portion of the contact members. This arrangement permits a larger separation between the ends of the contact members with the magnetic field turned off. When the magnetic field is applied, the two strips forming one contact member repel each other resulting in increased separation between the two lamination strips. Greater movement of the adjacent ends of the two contact members towards each other is thus produced with a given magnetic field strength.

When the magnetic field is removed, the contact members separate, and, due to their mechanical resilience, the inner ends of the contact members tend to vibrate. This vibration could cause the switch to make and break several times before the vibrations die out. By laminating the contact members in the manner described, the increased separation made possible reduces the chance that the vibration of the contact members will reestablish a low resistance condition across the gap. Also because the laminations are made of unequal thickness, their natural resonancies are different and they therefore vibrate at different frequencies, and, in doing so, the laminations react with each other to damp out the vibration of the contact members formed by the laminations more quickly. This lamination arrangement has been found to greatly enhance the speed and sharpness with which the switch can be made to pass from a closed condition to an open condition. Also the repelling effect between the ends of the laminations when the magnetic field is applied helps damp out any oscillations produced on the application of the magnetic field when the switch is closed, thus decreasing the time required to effectively close the switch.

Fourth, the contact members have been made of unequal lengths, thus the contact members have different mechanical resonancies. This ensures that they do not reach their maximum displacement due to resonant vibrations at the same time. This has the effect of increasing the minimum separation between the contact members during the oscillations produced during the abrupt removal of the magnetic field.

Fifth, the laminations are made of mu-metal having a very high permeability and are plated with a coating of rhodium over which is formed a coating of nickel plate. The plating of rhodium, due to its physical characteristics, has the effect of lowering the mechanical Q of the contact members, that is, it increases the damping rate of the members. The outer coating of nickel ensures that contact between the nickel particles and the contact members is between like materials and therefore no contact potentials are produced.

Figure 3:
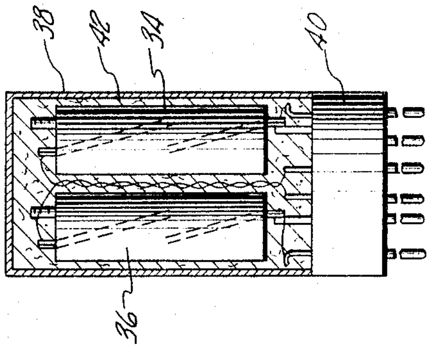
FIGURE 3 is a modified embodiment in which two or more switches may be operated simultaneously by one applied magnetic field.

The switch unit may be used in multiples in the manner shown in FIGURE 3 in which two switch elements, corresponding to the element described above in connection with FIGURES 1 and 2, are positioned as indicated at 34 and 36 respectfully inside a metallic nonconductive cover 38. A magnetic solenoid is positioned outside of the metal cover 38, the cover providing electrostatic shielding for the switch. Connections to the switch element may be brought out through a conventional plug base 40 and the switch element may be packed in a suitable shock resistant material 42.

While the use of sulfate wood turpentine has been described as useful in providing high speed operation of the above-described switch embodiment, it has been found that sulfate wood turpentine, or its constituents, pine oil, alpha-pinene and beta-pinene, has the ability to very significantly improve switching performance of the switch even though direct contact is made between the cantilever members. Merely by immersing the contacts of a standard reed switch or other types of relays in a body of liquid sulfate wood turpentine, or preferably its constituent, pine oil, very significant improvement in the switching properties can be realized. In conventional reed-type switches, continuous operation results in deterioration of the switching properties after a relatively short period of operation. The use of silicon oils has been used to improve the long term operation of the switch, nevertheless, the contact resistance and contact generated noise increases after the switch is used in continuous operation for a period of time. Particularly where the switch is used with very low voltage and current levels, it has been found that after repeated switching operations there may be cold welding or seizing of the contacts or erratic operation.

It has been found that the use of sulfate wood turpentine, or its principal constituent, pine oil, provides continuous high performance operation of such a switch far beyond that provided by the use of standard fluids. Where the high viscosity of pine oil is undesirable, the pine oil may be diluted with either alpha or beta-pinene. In particular, the frequency of switching and the number of switching operations that the switch can perform before switching performance noticeably deteriorates is greatly improved by the use of specified materials over the use of other known oils and other fluids heretofore tested for this purpose. Moreover, reliable switching performance can be achieved at much lower signal levels than has heretofore been possible.

While the invention has been described as utilizing an electromagnet, it will be appreciated that the field could be applied and removed by means of physically displacing a permanent magnet.

What is claimed is:

1. A high speed switch comprising a tubular housing, sulfate wood turpentine fluid filling the housing, fine nickel particles in the housing and movable through the fluid, first and second cantilever members, each member being supported at one end from the housing with the other end within the housing, said other end being free to move, the free ends being held in overlapping spaced relationship, each member including a pair of laminations of unequal thickness with the thinner laminations of both members being adjacent each other in the overlapping region, the two laminations of each member being held in contact with each other only at the supported ends thereof, the free length of the two members being unequal, and means applying a magnetic field having lines of force passing through the members and across the space between the free ends of the members, the magnetic field strength applied by said means being insufficient to move the members into contact with each other, an electrical circuit being completed through the two members by the nickel particles pressed in contact with each other and the free ends of the two members and bridging the overlapping space between the members.

2. A high speed switch comprising a housing, a low viscosity liquid consisting of sulfate wood turpentine filling the housing, magnetic particles in the housing and movable through the fluid, first and second cantilever members, each member being supported at one end with the other end within the housing, said other end being free, the free ends being held in closely spaced relationships, and means applying a magnetic field having lines of force passing through the members and across the space between the free ends of the members, the magnetic field strength applied by said means being insufficient to move the members into contact with each other, an electrical circuit being completed through the two members by the magnetic particles pressed in contact with each other and bridging the close space between the members.

3. A high speed switch comprising a housing, a low viscosity liquid consisting of sulfate wood turpentine filling the housing, first and second cantilever members, each member being supported at one end with the other end within the housing, said other end being free, the free ends being held in closely spaced relationship, and means applying a magnetic field having lines of force passing through the members and across the space between the free ends of the members to move the free ends of the members toward each other.

4. A high speed switch comprising at least one pair of contacts movable in relationship to each other, means for moving the contacts toward each other to complete an electrical circuit through the contacts, and a fluid medium surrounding and wetting the contacts, the fluid comprising pine oil as its principal constituent.

5. A high speed switch comprising at least one pair of contacts movable in relationship to each other, means for moving the contacts toward each other to complete an electrical circuit through the contacts, and a fluid medium surrounding and wetting the contacts, the fluid consisting of one or more of the compounds selected from the group consisting of sulfate wood turpentine, pine oil, alpha-pinene, and beta-pinene.

References Cited by the Examiner

UNITED STATES PATENTS

| | | | |
|---|---|---|---|
| 2,203,321 | 6/1940 | Bascom | 200—87 |
| 2,450,499 | 10/1948 | Brown | 200—87 |
| 2,487,433 | 11/1949 | Gardenhour | 200—150 X |
| 2,547,003 | 4/1951 | Hastings | 200—87 |
| 2,687,500 | 8/1954 | Jones et al. | 200—87 |
| 2,917,599 | 12/1959 | Ovshinsky | 200—87 |

BERNARD A. GILHEANY, *Primary Examiner.*

B. DOBECK, *Assistant Examiner.*